(12) United States Patent
Ljung (10) Patent No.: US 9,986,508 B2
(45) Date of Patent: May 29, 2018

(54) METHOD FOR OPERATING A TERMINAL DEVICE

(71) Applicant: Sony Corporation, Tokyo (JP)

(72) Inventor: Rickard Ljung, Helsingborg (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 16 days.

(21) Appl. No.: 14/771,562

(22) PCT Filed: Mar. 27, 2014

(86) PCT No.: PCT/IB2014/060198
§ 371 (c)(1),
(2) Date: Aug. 31, 2015

(87) PCT Pub. No.: WO2014/155323
PCT Pub. Date: Oct. 2, 2014

(65) Prior Publication Data
US 2016/0021616 A1 Jan. 21, 2016

(30) Foreign Application Priority Data
Mar. 27, 2013 (EP) .................................... 13161323

(51) Int. Cl.
*G08C 17/00* (2006.01)
*H04W 52/02* (2009.01)
*H04W 4/20* (2018.01)

(52) U.S. Cl.
CPC ......... *H04W 52/0251* (2013.01); *H04W 4/20* (2013.01); *Y02D 70/00* (2018.01);
(Continued)

(58) Field of Classification Search
CPC ................................................ H04W 52/0251
See application file for complete search history.

(56) References Cited

U.S. PATENT DOCUMENTS 8,937,876 B2 * 1/2015 Anderson ......... H04W 52/0225
370/252
9,241,314 B2 * 1/2016 Ismail ............... H04W 52/0258
(Continued)

FOREIGN PATENT DOCUMENTS

| CN | 102076065 A | 5/2011 |
|---|---|---|
| JP | 2000-502528 | 2/2000 |

(Continued)

OTHER PUBLICATIONS

Japanese Office Action for Corresponding Japanese Application No. 2015-560844, dated Sep. 28, 2016. No English language translation.
(Continued)

*Primary Examiner* — Guang W Li
(74) *Attorney, Agent, or Firm* — Renner, Otto, Boisselle & Sklar, LLP (57) ABSTRACT

The present invention relates to a method for operating a terminal device configured to establish a data communication upon receiving a request for establishing the data communication from a base station of a telecommunication network. According to the method, a usage state of the terminal device is determined. The usage state indicates a current usage of at least one function or application of the terminal device. Depending on the determined usage state a data traffic inactivity signal is sent to the base station. The data traffic inactivity signal instructs the base station to avoid sending the request for establishing the data communication to the terminal device for a predetermined amount of time.

14 Claims, 5 Drawing Sheets (52) U.S. Cl.
CPC ...... *Y02D 70/1222* (2018.01); *Y02D 70/1262* (2018.01); *Y02D 70/21* (2018.01)

(56) References Cited

U.S. PATENT DOCUMENTS

| | | | |
|---|---|---|---|
| 9,332,584 B2* | 5/2016 | Verger | H04W 76/048 |
| 9,338,748 B2* | 5/2016 | Wang | H04B 7/2656 |
| 9,407,391 B2* | 8/2016 | Jain | H04W 76/048 |
| 2004/0010808 A1 | 1/2004 | Decarmo | 725/139 |
| 2007/0213041 A1 | 9/2007 | Horie | |
| 2008/0186455 A1* | 8/2008 | Meier | G03B 21/206 353/85 |
| 2009/0193109 A1* | 7/2009 | Kuo | G06F 1/3209 709/223 |
| 2010/0083255 A1* | 4/2010 | Bane | H04L 51/043 718/101 |
| 2013/0059570 A1 | 3/2013 | Hara et al. | |
| 2014/0019743 A1* | 1/2014 | DeLuca | G06F 1/3206 713/100 |
| 2014/0064071 A1* | 3/2014 | Paladugu | H04W 28/0268 370/230 |
| 2014/0211676 A1* | 7/2014 | Chhabra | H04W 52/0209 370/311 |
| 2014/0334369 A1* | 11/2014 | Kaikkonen | H04W 52/0216 370/311 |
| 2015/0215989 A1* | 7/2015 | Bangolae | H04W 52/0251 370/311 |

FOREIGN PATENT DOCUMENTS

| | | |
|---|---|---|
| JP | 2007-282196 | 10/2007 |
| JP | 2013-055496 A | 3/2013 |
| WO | WO 97/24003 | 7/1997 |

OTHER PUBLICATIONS

International Preliminary Report on Patentability from corresponding International Application No. PCT/IB2014/060198, dated Oct. 8, 2015.

International Search Report and Written Opinion from corresponding International Application No. PCT/IB2014/060198, dated May 12, 2014.

Vadafone et al.; "UE A Fast Dormancy Behaviour"; 3GPP TSG-RAN WG2 Meeting #60, Nov. 9, 2007, Jeju, South Korea.

3GPP TR 36.822 V11.0.0 (Sep. 2012). 3rd Generation Partnership Project; Technical Specification Group Radio Access Network; LTE Radio Access Network (RAN) enhancements for diverse data applications (Release 11).

3GPP TS 25.331 V11.4.0 (Dec. 2012). 3rd Generation Partnership Project; Technical Specification Group Radio Access Network; Radio Resource Control (RRC); Protocol specification (Release 11).

3GPP TS 36.331 V11.2.0 (Dec. 2012). 3rd Generation Partnership Project; Technical Specification Group Radio Access Network; Evolved Universal Terrestrial Radio Access (E-UTRA); Radio Resource Control (RRC); Protocol specification (Release 11).

English translation of Official Action for corresponding Chinese Application No. 201480018864.4 dated Jan. 17, 2018.

* cited by examiner

METHOD FOR OPERATING A TERMINAL DEVICE

TECHNICAL FIELD

The present invention relates to a method for operating a terminal device, especially to a method for reducing the amount of time in which a data communication modem of a terminal device is active. The present invention relates furthermore to a method for operating a base station of a telecommunication network which supports the method for operating the terminal device. Finally, the present invention relates to a terminal device, for example a cellular phone, and a base station.

BACKGROUND ART

For operating a terminal device, for example a mobile cellular telephone, a smartphone or a tablet PC, in a wireless communication system, for example a telecommunication network comprising cellular data communication and telephony communication, the total battery life can be a crucial factor and may be one of the main performance indicators from a consumer's perspective. The time between required battery charges significantly impacts the consumer behavior and use case possibilities.

Figure 1:
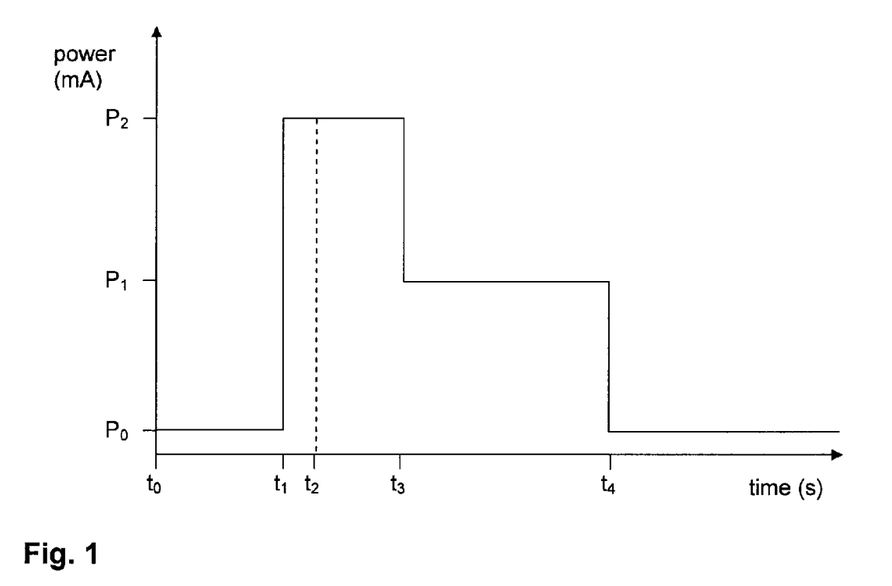
FIG. 1 shows a power consumption of terminal device as a function of time when a data communication is established and closed.

For telephony communication a transceiver unit of the terminal device, a so-called modem, is activated for receiving or initiating a call and is deactivated when the call is ended. However, when a data transfer occurs in a mobile communication network between the network or a base station of the network and the terminal device, for example for receiving or sending e-mails or uploading and downloading information to the internet, this activity will impact the average modem power consumption, especially in case the terminal is otherwise in dormant state. The reason for this is not only the power consumption during the data transfer itself, but also because usually the modem is forced to stay in a power consuming state for a certain time after each data activity, for example for avoiding frequent data communication setups which may increase response times from a user's perspective. FIG. 1 shows the overall principle of powering a modem or transceiver unit of a mobile terminal device in connection with a data communication. From t0 to t1 the terminal device is in idle mode and consumes idle mode power P0. At t1 a data communication activity is started. The modem is powered and the mobile device consumes a significantly higher amount of energy indicated by P2. In the time from t1 to t2 data is communicated via the modem. The time between t1 and t2 depends on the amount of data to be transferred and the data rate. At t2 the data transfer is finalized. However, the modem remains in a powered mode until t3. The time from t2 to t3 depends on a configuration of the mobile terminal device and the network. At t3 the terminal device moves to a power-saving state within a connected mode. In this power-saving state a reduced amount of power P1 is required which is still significantly higher than the power P0 required in idle mode. If no further data communication is required until t4, the data communication connection is closed and the terminal device enters the idle mode. Again, the time from t3 to t4 depends on configurations of the mobile terminal device and the network.

Many data transfer activities between the telecommunication network and the terminal devices are of various background types, for example e-mail updates, messages of social networks, data synchronizations, weather forecast updates, operating system related data, application related data, or updates and so on. This data communication traffic can be relatively frequent in devices performing a diversity of data applications, especially for example smartphones and tablet PCs. A certain portion of this data communication traffic will likely be initiated by servers or services of the telecommunication network rather than the terminal device itself. This means for example that an incoming e-mail could be notified by means of so-called push notifications rather than the terminal device polling for a new e-mail status. Also many other kinds of update services can be push-based, that means that these services are initiated by the telecommunication network and not by the terminal device itself.

In current telecommunication standards, a few features are available supporting saving of battery energy of a terminal device, for example in the 3GPP standard (third generation partnership project), WCDMA (wideband code division multiple access), HSPA (high-speed packet access) and LTE (long-term evolution). For example, for WCDMA/HSPA a fast dormancy signal is available, where a terminal device can transmit a signal after finalizing a data communication session indicating its intention to go into a dormant state. For LTE there is another possibility introduced in release 11 where the terminal device can signal that it wants the network configurations to be as power consumption optimized as possible. This was e.g. studied and proposed in section 6 of 3GPP document 36.822. Furthermore, an introduction of this functionality was part of the "LTE Radio Access Network (RAN) enhancements for diverse data applications".

However, there is still a need for an improved saving of a battery energy of a terminal device.

SUMMARY

According to the present invention, this object is achieved by a method for operating a terminal device as defined in claim 1, a method for operating a base station of a telecommunication network as defined in claim 8, a terminal device as defined in claim 10, and a base station of a telecommunication network as defined in claim 14. The dependent claims define preferred and advantageous embodiments of the invention.

According to an aspect of the present invention, a method for operating a terminal device, in particular a battery-powered terminal device, for example a mobile terminal device, is provided. The terminal device is configured to establish a data communication upon receiving a request for establishing the data communication from the base station of a telecommunication network. According to the method, a usage state of the terminal device is determined. The usage state indicates a current usage of at least one function or application of the terminal device. For example, the usage state may indicate, if the terminal device is currently in use, for example if a screen or display of the terminal device is switched on or switched off, or if a proximity sensor of the terminal device indicates that the terminal device is held in a user's hand. Furthermore, the usage state may indicate which applications are currently running, for example a music playback, a video streaming, a web browsing or an e-mail transfer. Depending on the determined usage state a data traffic inactivity signal is sent to the base station of the telecommunication network. The data traffic inactivity signal indicates or instructs the base station to avoid sending a request for establishing a data communication to the terminal device for a predetermined amount of time. By transmitting the data traffic inactivity signal to the base station, the terminal device can propose that during the predetermined amount of time the telecommunication network is advised not to initiate any background oriented traffic. In this manner, the terminal device can ensure that the data modem can stay in a power efficient idle mode for as long as possible, since it can ensure that not only data communications established by the terminal device, but also network initiated data communications, for example push notifications, can be limited or postponed to suitable time instance. Thus, the battery life time of the terminal device may be increased.

The method may include modifications to existing standards in order to be used. Changes may be required to for example in 3GPP standards for WCDMA/HSPA and LTE, for example by modifying 3GPP TS (technical specification) 25.331 and 36.331 for WCDMA/HSPA and LTE, respectively. For example, in 25.331 an information element may be added in addition to the fast dormancy release indicator signaling. In 36.331 an UE (user equipment) signaling may be added for this purpose into the RRC (radio resource control) connection release procedure. However, alternative locations for these modifications in the 3GPP specifications are possible, still resulting in the same concept of an inactivity timer suggestion signaled by the terminal device.

According to an embodiment, the method comprises furthermore comparing the usage state with a user defined setting. In this embodiment, the data traffic inactivity signal is sent depending on the comparison. The user defined settings may comprise for example an enabling or disabling of sending the data traffic inactivity signal at all, and for example a configuration defining certain functions or applications of the terminal device which, when they are running, inhibit sending the data traffic inactivity signal. In other words, when certain applications or functions are running, for example functions or applications which require a real-time data communication, the data traffic inactivity signal is not sent to the base station. However, when no such application or function is running, the data traffic inactivity signal is sent to the base station. Furthermore, the data traffic inactivity signal may be sent when a certain application or function is running, for example when a music playback application is running and the user is listening to the music. Furthermore, when the usage state indicates that the terminal device is currently not used, for example because the screen is switched off or proximity sensors of the terminal device indicate that the terminal device is not held in the user's hand, the data traffic inactivity signal may be sent.

According to a further embodiment, a configuration information comprising a data traffic inactivity timer value is sent to the base station. The data traffic inactivity timer value indicates the predetermined amount of time for avoiding sending a request for establishing a data communication to the terminal device after the base station has received the data traffic inactivity signal. By configuring the data traffic inactivity timer value separately from activating the data traffic inactivity period, a communication overhead can be reduced and the data traffic inactivity signal may be a single bit which is sent to the base station in connection with another protocol data unit. However, according to another embodiment, the data traffic inactivity signal may comprise the data traffic inactivity timer value. This may facilitate a variable predetermined amount of time for the data traffic inactivity which may be adapted to the current usage state of the terminal device.

According to another embodiment the terminal device comprises a transceiver unit for establishing the data communication. The transceiver unit is also known as modem. According to this embodiment, the transceiver unit is powered down upon sending the data traffic inactivity signal to the base station. Thus, battery power can be saved significantly. The transceiver unit may be powered up when a data communication is established initiated by the terminal device or when the terminal device receives a paging signal from the telecommunication network or base station. However, such a paging signal indicating that a data communication shall be established, should be postponed by the telecommunication network if possible for at least the predetermined amount of time after having received the data traffic inactivity signal.

According to an embodiment, the predetermined amount of time is within a range of 1 to 60 minutes. Furthermore, the predetermined amount of time may be configurable by a user of the terminal device or may be derived and adapted from historical information concerning a usage of data communications in connection with applications and functions of the terminal device in the past.

According to another aspect of the present invention, a method for operating a base station of a telecommunication network or a server of a telecommunication network is provided. The base station is configured to send a request for establishing a data communication to a terminal device. The telecommunication network may comprise a cellular data and telephony communication network. According to the method, a data traffic inactivity signal is received from the terminal device. The data traffic inactivity signal indicates and instructs the base station to avoid requesting to establish a data communication to the terminal device for a predetermined amount of time. Upon receiving the data traffic inactivity signal, the base station inhibits sending the request for establishing the data communication to the terminal device for the predetermined amount of time.

Although there may be a good knowledge within the network about when data traffic may be initiated in order to utilize the modem of the terminal device in a most power-efficient manner and to ensure as long continuous periods of dormant modem states as possible, there may be many aspects within the terminal device and due to an interaction between the end user and the terminal device that may impact how the data communication between the network and the terminal device is handled in the most power-efficient manner and when dormant periods should occur. Such aspects may comprise for example whether the terminal device is currently actively used, for example whether the user has the terminal in their hands or not, the screen is switched on or off, or in which way the terminal is used, for example music playback, video streaming, web browsing, e-mail transfer and so on. These aspects are typically unknown for the network but can be taken into consideration when they are indicated via the data traffic inactivity signal received from the terminal device. Thus, by inhibiting sending the request for establishing the data communication to the terminal device for the predetermined amount of time after having received the data traffic inactivity signal, the base station may contribute to a power-efficient operation of the terminal device thus prolonging a battery life of the terminal device.

According to an embodiment, a request for establishing a data communication is received from the terminal device during the predetermined amount of time after receiving the data traffic inactivity signal from the terminal device. In other words, while the base station in inhibiting sending the request for establishing the data communication, the base station receives a request for establishing a data communication from the terminal device. In this case, upon receiving the request for establishing a data communication from the terminal device, inhibiting sending the request for establishing the data communication is aborted and hence the data communication is established. Thus, when for example during the predetermined amount of time of data traffic inactivity, a request for establishing a data communication is issued by the terminal device, the data communication is nevertheless established. The request for establishing the data communication sent by the terminal device may be based on a user interaction, for example a user starting a web browser on the terminal device.

According to a further aspect of the present invention, a terminal device is provided. The terminal device comprises a transceiver unit, a processing unit and a transceiver activity control unit. The transceiver unit is configured to establish a data communication between the terminal device and a base station of a telecommunication network. The processing unit is configured to execute at least one function or application of the terminal device. The transceiver activity control unit is configured to determine a usage state of the terminal device. The usage state indicates a current usage of the at least one function or application executed by the processing unit. The transceiver activity control unit is furthermore configured to send a data traffic inactivity signal to the base station depending on the determined usage state. The data traffic inactivity signal instructs the base station to avoid sending a request for establishing a data communication to the terminal device for a predetermined amount of time.

According to an embodiment, the terminal device is configured to perform the above-described method. Furthermore, the terminal device comprises a portable battery-powered device, for example a mobile phone, a personal digital assistant, a mobile music player, a tablet computer, a laptop computer, a notebook computer, or a navigation system.

According to another aspect of the present invention, a base station of a telecommunication network is provided. The base station comprises a transceiver unit for establishing a data communication between a terminal device and a base station, and a processing unit. The processing unit is configured to receive a data traffic inactivity signal from the terminal device. The data traffic inactivity signal instructs the base station to avoid to send a request for establishing a data communication to the terminal device for a predetermined amount of time. Upon receiving the data traffic inactivity signal, the processing unit inhibits sending a request for establishing a data communication to the terminal device for the predetermined amount of time.

According to an embodiment, the base station is configured to perform the above-described method for operating a base station.

Although specific features described in the above summary and the following detailed description are described in connection with specific embodiments and aspects of the present invention, it is to be understood that the features of the embodiments and aspects may be combined with each other unless specifically noted otherwise.

BRIEF DESCRIPTION OF DRAWINGS

The invention will now be described in more detail with reference to the accompanying drawings.

DESCRIPTION OF EMBODIMENTS

In the following, exemplary embodiments of the invention will be described in more detail. It has to be understood that the features of the various exemplary embodiments described herein may be combined with each other unless specifically noted otherwise.

Figure 2:
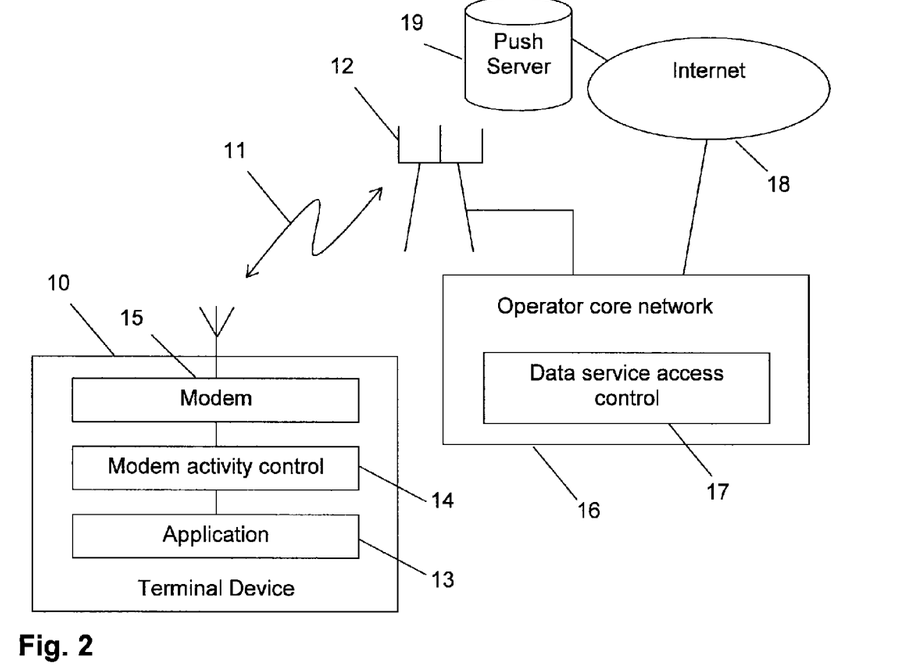
FIG. 2 shows schematically a terminal device according to an embodiment of the present invention in connection with a base station of a telecommunication network.

FIG. 2 shows a terminal device 10 connected to a base station 12 of a telecommunication network via a wireless interface or air interface 11. The terminal 10 comprises an application unit 13, for example a processing unit executing an operating system comprising several functions as well as applications or so-called apps executed by the processing unit. The terminal device comprises furthermore a modem activity control unit 14 for controlling a transceiver or modem 15. The transceiver 15 is configured to establish a data communication between the terminal device 10 and the base station 12. The transceiver unit 15 may furthermore be adapted to establish a connection to the base station 12 for a telephony communication and for receiving paging signals from the base station 12 as it is known in the art. The modem activity control unit 14, which may be called also transceiver activity control unit, is configured to determine a usage state of the terminal device 10. The usage state indicates a current state of the functions or applications 13 being presently executed on the terminal device 10.

As typical for mobile communication systems, the data communication between the transceiver 15 and the base station 12 does not mean that the transceiver 15 is continuously active, but only that the terminal device 10 is belonging to a certain mobile communication system and regularly listens to control signals, for example paging signals, transmitted from the base station 12. The terminal device 10 may include more than one modem units or transceiver units 15 responsible for handling the communication with one or more base stations 12 according to a standardized terminal-base station interface. Based on the current usage state of the terminal device 10, the modem activity control unit 14 may send a data traffic inactivity signal via the transceiver 15 to the base station 12. The data traffic inactivity signal instructs the base station to avoid sending a request for establishing a data communication to the terminal device for a predetermined amount of time. Thus, the transceiver unit 15 can be powered down into an idle state thus reducing the amount of power consumed by the terminal device 10. The transceiver unit 15 may be powered up into an active mode upon receiving a request for establishing a data communication from the application unit 13. Furthermore, the transceiver unit 15 may be powered up into the active state upon receiving a request for establishing a data communication from the base station 12. However, due to the data traffic inactivity signal, sending requests for establishing a data communication to the terminal device 10 should be postponed in the base station or telecommunication network.

The telecommunication network may comprise, as shown in FIG. 2, for example an operator core network 16 comprising a data service access control unit 17. The data service access control unit 17 may receive the data traffic inactivity signal via the base station 12 and may postpone requests for establishing the data communication to the terminal device 10 for the predetermined amount of time. The operator core network 16 may be connected to the internet 18 which may comprise or which may be coupled to a push server 19. The push server 19 may comprise for example an e-mail server pushing new incoming e-mails via the internet 18 and the operator core network to the terminal device 10. However, during the predetermined amount of time after receiving the data traffic inactivity signal, the data service access control unit 17 may postpone such push services until the predetermined amount of time has expired. Nevertheless, the data service access control unit 17 may establish a data communication to the terminal device 10 within the predetermined amount of time, when a real-time data traffic session is requested.

In other words, when the network receives the data traffic inactivity signal from the terminal device 10, the network is instructed to not initiate any non-real-time data traffic sessions with the terminal device 10 until the timer expires. This could typically be realized by the data services access control unit 17 within the core network 16 that ensures that the network is not initiating any data sessions except for specific quality of service (QoS) classes. In this manner, a packet-switched voice call or other real-time services would not be limited, while for example e-mail or other background traffic requiring a data communication can be limited. Once the timer is timed out, the network-initiated services, such as push notifications and other network-initiated traffic, will be triggered for traffic to the terminal device 10. In the context of this description and the appended claims the term "base station" represents a base station of a telecommunication network and further processing parts of the telecommunication network. Therefore, the functions or method steps described herein performed by the base station may be performed by the base station 12 itself or any other equipment of the telecommunication network, for example by the operator core network 16 or the data service access control 17 as shown in FIG. 2.

Figure 3:
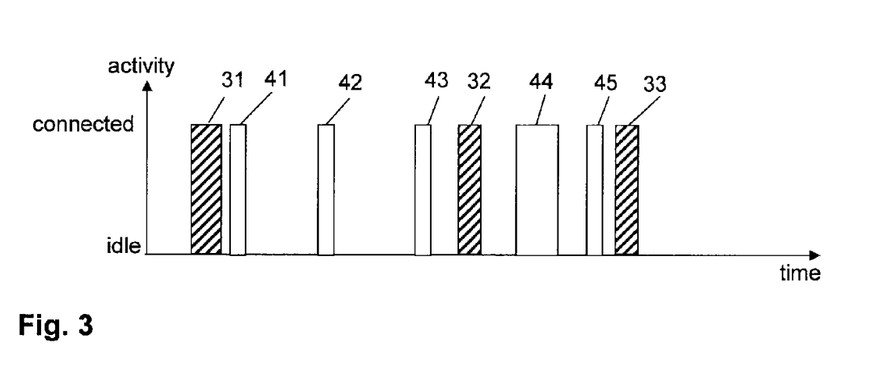
FIG. 3 shows a transceiver activity of a terminal device as a function of time.
Figure 4:
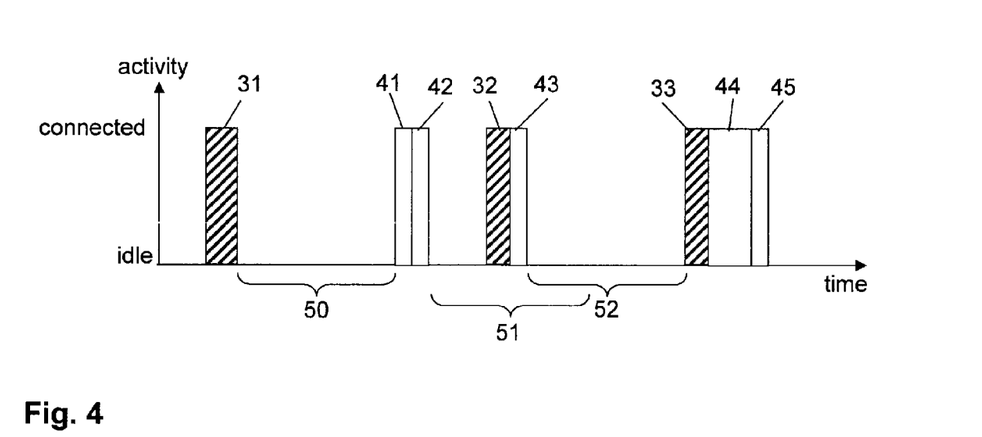
FIG. 4 shows a transceiver activity of a terminal device according to an embodiment of the present invention as a function of time.
Figure 5:
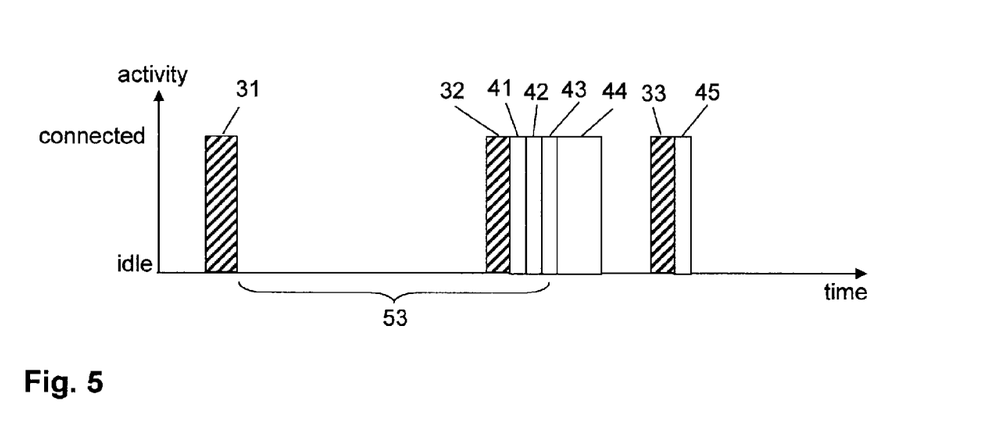
FIG. 5 shows a further transceiver activity of a terminal device according to an embodiment of a present invention as a function of time.

A few examples of the changes in data traffic behavior for realizing the above-described method are illustrated in FIGS. 3-5. FIG. 3 shows a conventional behavior without the above-described method, FIG. 4 shows the behavior in connection with the above-described method with a relatively short predetermined amount of time for the inactivity time, and FIG. 5 shows a data traffic behavior in connection with the above-described method with a relatively long predetermined amount of time. The predetermined amount of time may be used to initialize an inactivity timer in the network.

FIG. 3 shows data traffic activity as a function of time. The data traffic may be in the connected state or in the idle state. Data traffic activities may be initiated either by the terminal device 10 or by the network via the base station 12. Data traffic activities initiated by the terminal device 10 are indicated by the striped blocks 31 to 33. Data traffic activities initiated by the network are indicated by blocks 41 to 45. In FIG. 3, the data communications are established whenever a corresponding request for transferring data occurs. In connection with the typical power-down behavior of the transceiver unit 15, the frequent data communication activities shown in FIG. 3 lead to a large power consumption of the transceiver unit 15.

In FIG. 4, the above-described method using a data traffic inactivity signal to postpone requests for establishing a data communication to the terminal device 10 for a predetermined amount of time is used. After the traffic activity 31 the inactivity timer having a duration indicated by the bracket 50 is started. Thus, the traffic activities 41 and 42 are postponed and combined in order to reduce the power consumed by the transceiver unit 15. After the data traffic 42 the inactivity timer is started again due to sending a further data traffic inactivity signal from the terminal device 10 to the base station 12. The duration of the inactivity timer is indicated by bracket 51. Thus, the data traffic 43 is postponed. However, due to an urgent or real-time data traffic request from the terminal device 10, the inactivity timer is aborted and the data traffic blocks 32 and 43 are inserted. At the end of data traffic block 43 a next inactivity time 52 is started postponing the data traffic requests 44, 45 and 33. These data traffic communications are performed after the inactivity time 52 is elapsed.

FIG. 5 shows traffic activity according to the above-described method with a much longer inactivity timer compared to the one used in FIG. 4. After the data traffic communication 31 the data traffic inactivity signal is sent from the terminal device 10 to the base station 12 with the intention to postpone data traffic for the predetermined amount of time of an inactivity time 53. However, the inactivity time 53 is aborted due to an urgent or real-time data request initiated by the terminal device 10 and thus data traffic 42 is transferred before the inactivity timer has expired. Nevertheless, the data traffic blocks 41 to 43 have been postponed and are executed together with data traffic block 44 in connection with the data traffic block 32.

Figure 6:
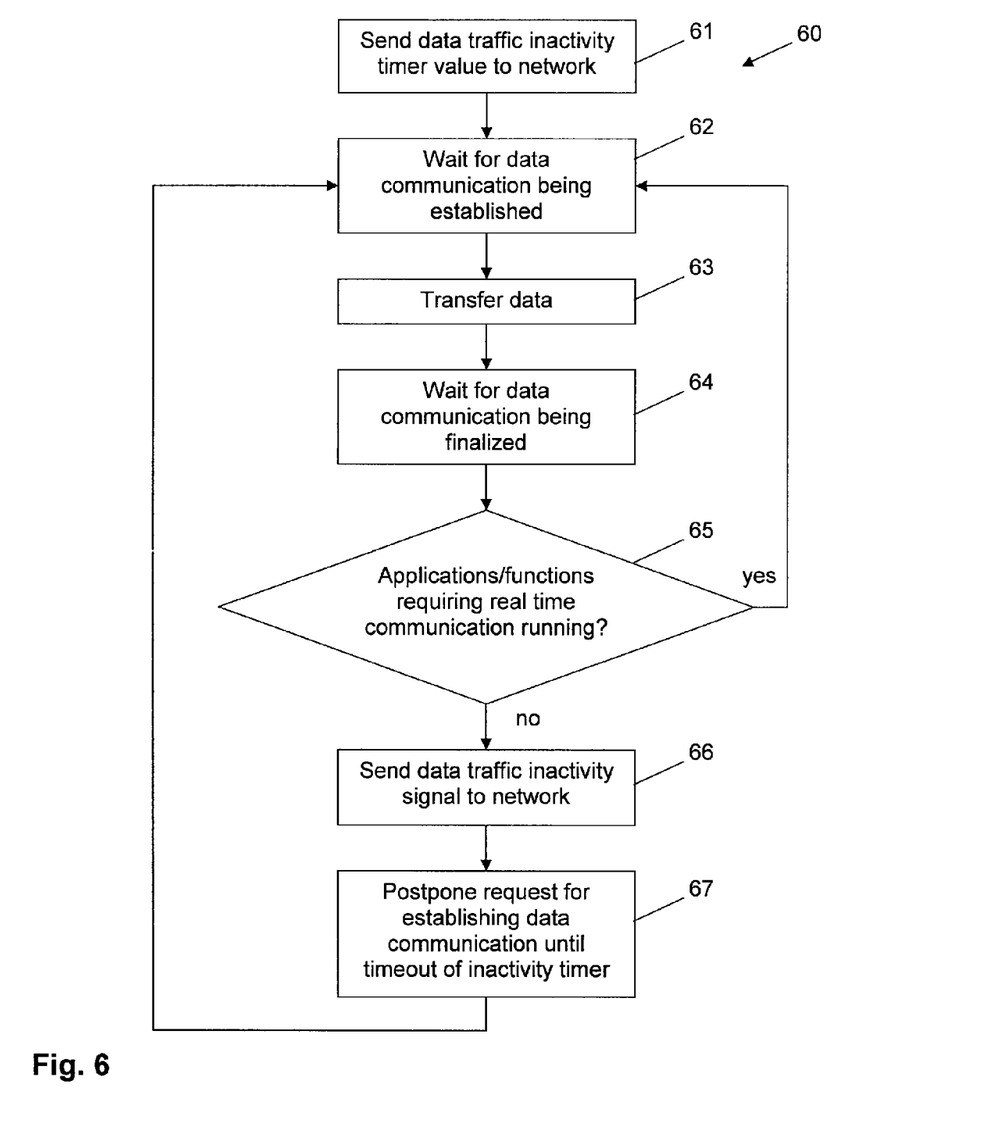
FIG. 6 shows a flowchart comprising steps of a method for operating a terminal device according to an embodiment of the present invention.

FIG. 6 shows a diagram 60 comprising method steps performed by the terminal device 10. In step 61 a data traffic inactivity timer value is sent via the transceiver unit 15 to the network, for example to the base station 12. The data traffic inactivity timer value specifies the predetermined amount of time for which the base station 12 shall avoid sending a request for establishing a data communication to the terminal device 10 after the terminal device 10 has sent a data traffic inactivity signal to the base station 12. In step 62 a data communication initiated either by the terminal device 10 itself or by the network, is established, and in step 63 data is transferred between the terminal device 10 and the base station 12. In step 64 the data communication is finalized. In step 65, the modem activity control unit 14 determines the usage state of the terminal device 10. For example, the modem activity control unit 14 may check if applications or functions requiring real-time communication are running. If such applications or functions are running the method is continued in step 62 waiting for establishing a further data communication. If no such application or function is running, the method is continued in step 66, in which the terminal device 10 sends a data traffic inactivity signal to the base station 12. Furthermore, in step 67, requests for establishing a data communication initiated by applications or functions 13 of the terminal device 10 may be postponed until the inactivity timer has timed out. Then, the method is continued in step 62.

Figure 7:
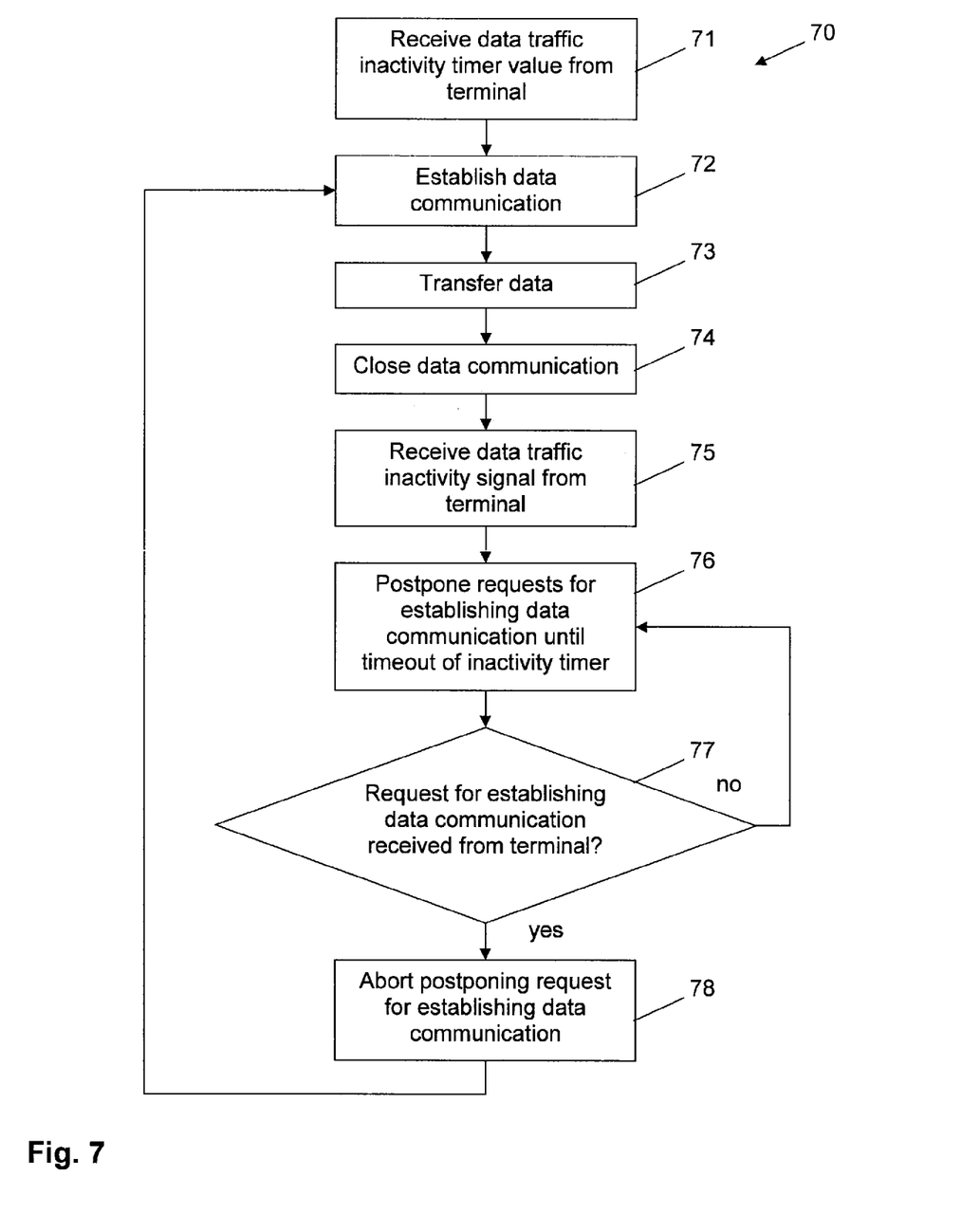
FIG. 7 shows a flowchart comprising steps of a method for operating a base station according to an embodiment of the present invention.

FIG. 7 shows a diagram 70 comprising method steps performed by the base station 12. In step 71 the base station 12 receives a data traffic inactivity timer value from the terminal device 10. This data traffic inactivity timer value may be forwarded by the base station 12 to the operator core network 16 and/or the data service access control unit 17. When a request for establishing a data communication is received from the terminal device 10 or from the push server 19 or from any other source, in step 72 a data communication is established. In step 73 data is transferred via the established data communication until in step 74 the data communication is closed. When the base station 12 receives a data traffic inactivity signal from the terminal device 10 in step 75, this data traffic inactivity signal may be forwarded to the data service access control unit 17. Either the data service access control unit 17 or the base station 12 may then postpone in step 76 requests for establishing a data communication until the inactivity timer has timed out. Such requests may come from a push server 19 or any other server of the internet 18. As long as no request for establishing a data communication is received from the push server 19 or the internet 18 in step 77, the method is continued in step 76 waiting for the inactivity timer to time out. However, when it is detected in step 77 that the timer has timed out or a request for establishing a data communication is received from the terminal device 10 or a request from the internet 18 is received for establishing a data communication due to a real-time application, the method is continued in step 78, in which the postponing of requests for establishing a data communication is aborted and a data communication is established in step 72.

To sum up, the above-described method synchronizes network requested data application traffic activities. The synchronization of such traffic is handled by introducing a traffic time out indicator, e.g. the data traffic inactivity signal, into for example 3GPP specifications, suggesting push services and other network-initiated traffic to be halted during a predetermined amount of time. Together with similar own control of terminal device initiated traffic activities within the terminal device, the transceiver can stay in dormant states, especially when a majority of traffic is push-based or network-initiated. This will thereby prolong the total battery lifetime of the terminal device.

As the data traffic inactivity signal is initiated by the terminal device, there are large possibilities within the terminal device to easily interact with the user for triggering the data traffic inactivity signal. For example, the data traffic inactivity signal may be initiated when a screen is switched off or local music playback is initiated or a game is started or any other use case of choice. Further, the selection of the inactivity timer value can be subject to a user input. The meaning of the data traffic inactivity signal is intended as guidance to the telecommunication network while any data activation is still possible to be initiated by the telecommunication network and left to network implementations. In other words, it will be up to the network implementation and operator network tuning what kind of data traffic is limited or postponed by the data traffic inactivity signal, for example based on quality of service classes. As described above, the telecommunication network may discard the inactivity timer when the terminal device itself initiates a data transfer before the inactivity timer expires. At that point all waiting push services or the like data may be delivered to the terminal device.

In order to limit the amount of control signal overhead in the radio interface a default timer value of choice may be transmitted by the terminal device during a radio resource control (RRC) connection establishment. Thereafter, the terminal device can signal one single additional bit during connection release as the data traffic inactivity signal that it would like to restart or activate the connectivity timer. The connection establishment is described in 3GPP 25.331/36.331 for WCDMA/LTE, respectively, and here an additional parameter for the data traffic inactivity timer value could be introduced. As described above, the activation signal, i.e. the data traffic inactivity signal, could also be included in other sections of 3GPP specifications 25.331 and 36.331.

While exemplary embodiments have been described above, various modifications may be implemented in other embodiments. For example, the above-described method may be applied to all types of terminal devices using data traffic, for example smart phones as well as specific machine-type communication devices. Furthermore, within 3GPP the above-described method may be introduced either as a general radio interface improvement or as a continuation of the improvements planned for specific machine-type communication.

The invention claimed is:

1. A method for operating a terminal device, the terminal device being configured to establish a data communication upon receiving a request for establishing the data communication from a base station of a telecommunication network, the method comprising the steps of:
   determining, by a transceiver activity control unit of the terminal device, a usage state of the terminal device, the usage state indicating a current usage of at least one function or application of the terminal device,
   sending a data traffic inactivity signal from the terminal device to the base station depending on the determined usage state, the data traffic inactivity signal instructing the base station to avoid sending the request for establishing the data communication to the terminal device for a predetermined amount of time, and
   sending a configuration information comprising a data traffic inactivity timer value from the terminal device to the base station, the data traffic inactivity timer value indicating the predetermined amount of time for avoiding sending the request for establishing the data communication to the terminal device.

2. The method according to claim 1, further comprising:
   comparing the usage state with a user defined setting,
   wherein the step of sending the data inactivity signal comprises sending the data traffic inactivity signal depending on the comparison.

3. The method according to claim 1, wherein the step of determining the usage state of the terminal device comprises determining, when at least one running function or application of the terminal device requires a real time data communication.

4. The method according to claim 1, wherein the data traffic inactivity signal comprises a data traffic inactivity timer value indicating the predetermined amount of time for avoiding sending the request for establishing the data communication to the terminal device.

5. The method according to claim 1, wherein the terminal device comprises a transceiver unit for establishing the data communication, wherein the method comprises:
   powering down the transceiver unit upon sending the data traffic inactivity signal to the base station.

6. The method according to claim 1, wherein the predetermined amount of time is within the range of 1 to 60 minutes.

7. A method for operating a base station of a telecommunication network, the base station being configured to send a request for establishing a data communication to a terminal device, the method comprising the steps of:

receiving from the terminal device a data traffic inactivity signal, the data traffic inactivity signal instructing the base station to avoid sending the request for establishing the data communication to the terminal device for a predetermined amount of time, receiving from the terminal device a configuration information comprising a data traffic inactivity timer value, the data traffic inactivity timer value indicating the predetermined amount of time for avoiding sending the request for establishing the data communication to the terminal device, and upon receiving the data traffic inactivity signal and the data traffic inactivity timer value, inhibiting sending the request for establishing the data communication to the terminal device for the predetermined amount of time.

8. The method according to claim 7, further comprising:

receiving a request for establishing a data communication from the terminal device during the predetermined amount of time after receiving the data traffic inactivity signal from the terminal device, and upon receiving the request for establishing a data communication from the terminal device, aborting the step of inhibiting sending the request for establishing the data communication.

9. A terminal device, comprising:

a transceiver unit for establishing a data communication between the terminal device and a base station of a telecommunication network, and a processing unit configured to execute at least one function or application, and a transceiver activity control unit configured to determine a usage state of the terminal device, the usage state indicating a current usage of the at least one function or application, to send a data traffic inactivity signal to the base station depending on the determined usage state, the data traffic inactivity signal instructing the base station to avoid sending a request for establishing the data communication to the terminal device for a predetermined amount of time, and to send a configuration information comprising a data traffic inactivity timer value to the base station, the data traffic inactivity timer value indicating the predetermined amount of time for avoiding sending the request for establishing the data communication to the terminal device.

10. The terminal device according to claim 9, wherein the terminal device is configured to compare the usage state with a user defined setting, and wherein the transceiver activity control unit sends the data traffic inactivity signal depending on the comparison.

11. The terminal device according to claim 9, wherein the terminal device comprises a portable battery powered device.

12. The terminal device according to claim 9, wherein the terminal device comprises at least one device of a group consisting of a mobile phone, a personal digital assistant, a mobile music player, a tablet computer, a laptop computer, a notebook computer, and a navigation system.

13. A base station of a telecommunication network, comprising:

a transceiver unit for establishing a data communication between a terminal device and the base station, and a processing unit configured to receive from the terminal device a data traffic inactivity signal, the data traffic inactivity signal instructing the base station to avoid sending a request for establishing the data communication to the terminal device for a predetermined amount of time to receive from the terminal device a configuration information comprising a data traffic inactivity timer value, the data traffic inactivity timer value indicating the predetermined amount of time for avoiding sending the request for establishing the data communication to the terminal device, and, upon receiving the data traffic inactivity signal and the data traffic inactivity timer value to inhibit sending the request for establishing the data communication to the terminal device for the predetermined amount of time.

14. The base station according to claim 13, wherein the base station is configured to receive a request for establishing a data communication from the terminal device during the predetermined amount of time after receiving the data traffic inactivity signal from the terminal device and, upon receiving the request for establishing a data communication from the terminal device, to abort the inhibiting of the sending of the request for establishing the data communication.

* * * * *